United States Patent Office 3,095,273
Patented June 25, 1963

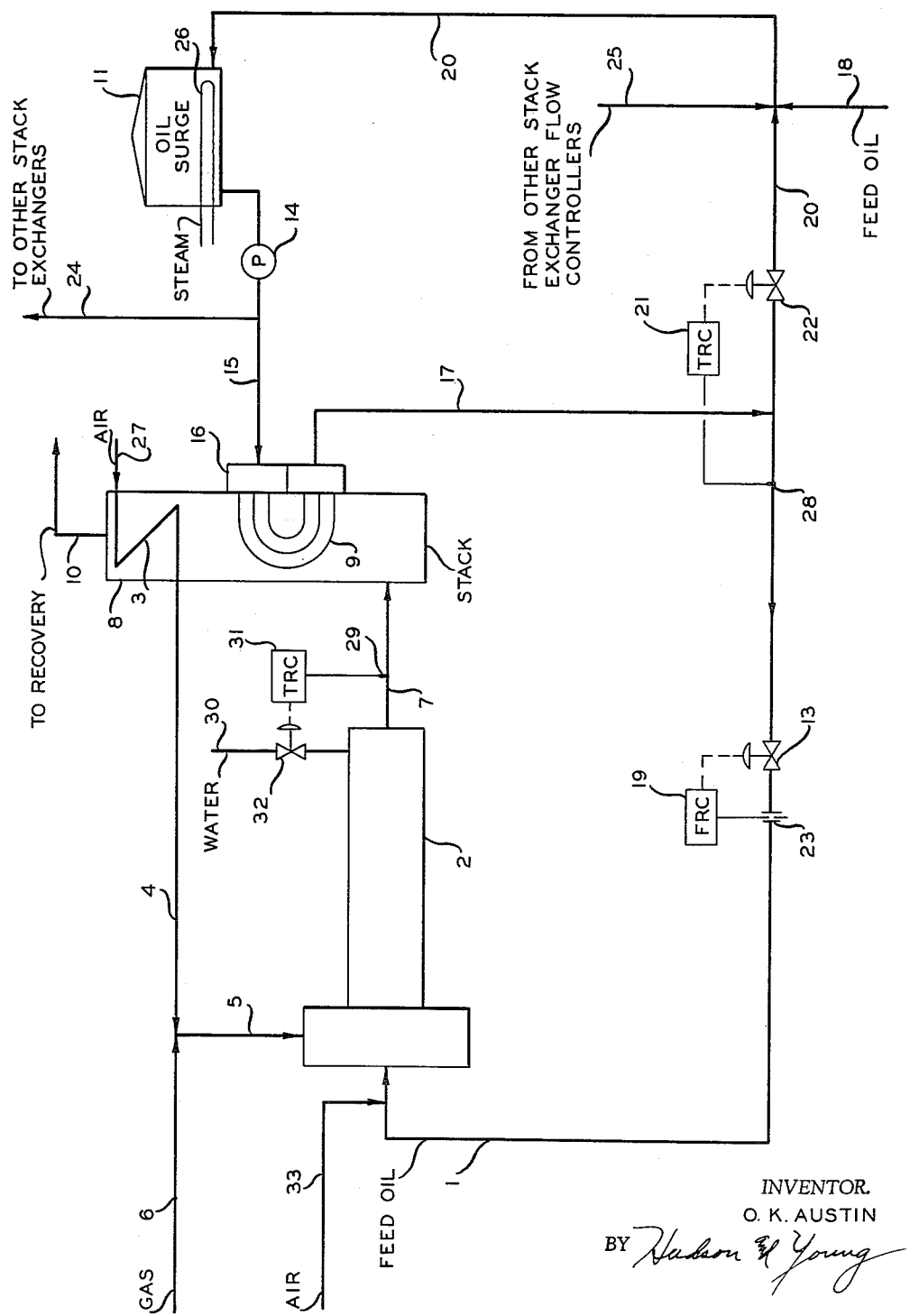

3,095,273
CONTROL OF CARBON BLACK FEED
OIL PREHEAT
Oliver K. Austin, Bartlesville, Okla., assignor to Phillips Petroleum Company, a corporation of Delaware
Filed Apr. 17, 1961, Ser. No. 103,600
9 Claims. (Cl. 23—209.6)

This invention relates to carbon black production and to an improved method and apparatus for preheating an oil feed to a carbon black production furnace.

In the production of carbon black by incomplete combustion of an oil feed stock in a carbon black furnace or reactor, it has been found that preheating of the oil to an elevated temperature below incipient cracking prior to injection of the oil into the reactor decreases the amount of oil burned in the reactor to supply the heat for the production of the carbon black thereby increasing the yield of the carbon black. It is also recognized that the preheating of the oil to a predetermined and at least relatively constant temperature, assists in the production of carbon black of more nearly uniform quality. Fired heaters employing extraneous fuel have been used in the preheating of the carbon black charge stocks. This method of preheating has at least in part given away to the use of the hot furnace effluents. The carbon black furnace or reactor effluents have ample temperature for preheating of the feed oils to the individual furnaces, but their temperature is not constant. Variation in the rate of introduction of quench water at the outlet end of the carbon black reactor obviously causes variation in effluent temperature. Also, variation in quench water rate of flow alters the volume of furnace effluent. The rate of flow of reactor effluents varies also for other reasons, as from irregularity in gas and air flow tangentially into the furnace as well as variations in flow of charge stock to the furnace. All of these variations or irregularities in flow directly cause variation of reactor effluent flow. Furthermore, charge stock entering the indirect heat exchange can vary somewhat in temperature as from day to night and night to day. Fairly rapid changes in temperature of feed oil is caused by rain storms dropping water on the pipes carrying the oil.

An object of this invention is to provide a method and apparatus for maintaining the oil charge temperature and flow rate to the carbon black production furnace at a relatively uniform temperature and flow rate. Another object is to provide a method and apparatus for utilizing available heat from the furnace effluent. Still another object is to provide a method and apparatus for cooling carbon black furnace effluent whereby the amount of quench water required can be reduced. Still another object is to provide a method and apparatus for preheating oil charge to a carbon black furnace and at the same time maintaining the oil surge tank at a sufficiently high temperature that the charge oil therein is maintained in an easily pumpable condition. Other objects and advantages of this invention will be realized upon reading the following description which, taken with the attached drawing, forms a part of this specification.

The drawing illustrates, in diagrammatic form, one arrangement of apparatus parts for carrying out the objects and realizing the advantages of this invention.

Briefly, this invention involves passing an excess of oil over that required for use in a carbon black reactor through an indirect heat exchanger whereby the oil is heated to a required temperature. The so preheated oil is divided in two portons, one portion being charged to the carbon black furnace at a predetermined flow rate and the excess or other portion of the preheated oil is returned to the oil charge tank. Since the portion of oil charged to the reactor is maintained at a predetermined flow rate, the rate of flow of the other portion of the oil is regulated in response to the temperature of the oil charged to the carbon black reactor. Thus, since the heat available in the indirect heat exchanger, which employs reactor effluent as the heating medium is an excess over that required for actually preheating only the oil charged to the furnace, the temperature of the oil exiting from the preheater is regulated by regulation of the flow rate of the oil through the preheater. This second portion of oil is then returned to the oil surge tank in which the oil is maintained at a temperature at least sufficiently high to make certain that the oil is in an easily pumpable condition.

Referring to the drawing, reference numeral 1 identifies a conduit in which preheated oil charge is passed for introduction into the furnace. Carbon black production furnaces are many times known as carbon black reactors. Effluent gases containing carbon black in suspension leave reactor 2 and pass through a conduit 7 into a stack 8 which is herein utilized as an indirect heat exchanger. The hot furnace gases containing carbon black pass upward in this stack and are heat exchanged with feed oil passing through the preheater coils 9. The gases and black pass on upward and contact coil 3 in which air for use in the furnace is preheated. From coil 3, the preheated air passes through a conduit 4 and is introduced into the reactor 2 through conduit 5 along with fuel from conduit 6. The thus twice cooled furnace effluent gases and suspended carbon black pass from stack 8 through a conduit 10 to a recovery system, not shown.

The oil feed flowing through coils 9 originate in an oil surge tank 11. This oil from tank 11 passes through a conduit 15 under the influence of a pump 14 for passage into a heat exchanger 16 of which coils 9 are a part. The thus heated charge oil leaves heat exchanger 16 and passes through a conduit 17 and a portion is divided out and passed through conduit 1 as charge oil to the reactor inlet tube while the remainder or other portion of the charge oil is passed through conduit 20 and returned to the oil surge tank 11. A rate of flow controller 19 is set to regulate the rate of flow of oil in conduit 1 at a predetermined value as sensed by an orifice plate assembly 23 upon regulation of motor valve 13. The rate of flow of the by-passed preheated oil in conduit 20 is regulated by actuation of a motor valve 22 by a temperature recorder-controller 21 operating in response to a thermocouple 28 positioned in conduit 1. This temperature recorder-controller 21 is set to maintain a predetermined temperature of oil in conduit 1 by actuation of motor valve 22. This opening and throttling of motor valve 22 permits an increased flow or a decreased flow of oil from surge tank 11 through heat exchanger 16. Thus, when temperature of the oil in conduit 1 as sensed by thermocouple 28 becomes higher than a predetermined temperature the temperature recorder-controller 21 opens motor valve 22 to permit a greater flow of oil through coils 9 thereby reducing the outlet temperature of the oil from exchanger 16. Likewise, when the temperature of the oil in conduit 1 sensed by thermocouple 28 becomes lower than the predetermined temperature, the temperature recorder-controller 21 adjusts motor valve 22 to throttle the flow of oil in conduit 20 which operation then reduces the flow of oil to coil 9 resulting in an increased outlet temperature from heat exchanger 16.

Mounted in the oil surge tank 11 is a heat exchange coil 26 for the use of steam, if and when needed, to preheat or to maintain this oil in a flowable condition. A conduit 24 is attached to conduit 15, as illustrated, for passage of oil charge stock to other oil preheaters and carbon black reactor furnaces similar to those illustrated in the drawing. Likewise, a conduit 25 leads excess preheated feed oil from other carbon black furnace heat exchangers and flow controller valves similar to flow controller valve 22, and heat exchanger 16.

Feed oil from a source, not shown, is passed through a conduit 18 for maintaining a workable volume of oil in surge tank 11.

A conduit 27 leads atmospheric air to the heat exchange coil 3.

A conduit 30 leads water from a source, not shown, for passage through a motor valve 32 for use in spray cooling of the furnace effluents at the outlet of the furnace. This quench water is sprayed into the outlet end of the furnace in response to temperature as sensed by a thermocouple 29 positioned in conduit 7. A temperature recorder-controller 31 is set to maintain the temperature of the effluent from the furnace at some predetermined value.

In normal operation, the temperature of the gaseous effluent containing carbon black in suspension from the furnace will vary after water quenching in the range of about 1100° to about 1300° F. This effluent will be cooled on passing through the oil preheater coils 9 to a temperature in the range of about 900° to about 1000° F. This partially cooled material is further cooled by the air preheater coil 3 to a temperature within the range of about 600° to about 800° F. In some instances it is desired to maintain the oil feed at about 750° F. Various types of carbon black production furnaces employing various types of charge oils require that the oils be preheated to different temperatures and introduced into the furnace at different flow rates. For example, as mentioned, this invention is adaptable to maintain the charge oil introduced to a furnace illustrated by reference numeral 2 at the temperature of about 750° F. at a flow rate of about 200 gallons per hour. Thus, in this case the rate of flow controller 19 is set to permit passage through valve 13 of the mentioned 200 gallons per minute. Thermocouple 28 senses the temperature of preheated oil and regulates motor valve 22 by way of temperature recorder-controller 21 which is set to maintain the temperature of 750° F. Thus, the flow rate of oil in conduit 20 as regulated by motor valve 22 varies as the heating effect of the oil in coil 9 changes.

An advantage of this invention is that there is usually available ample heat from the bypass oil flowing through conduit 20 to maintain the oil in surge tank 11 at a sufficiently high temperature that steam need not be used in coil 26. Thus, by use of this invention the steam normally required to maintain the oil in surge tank 11 in a pumpable condition is saved.

Furthermore, by use of the heat exchange coils 9 and 3 in stack 8, the furnace effluent is cooled from the abovementioned 1100° to 1300° F. to a temperature of from 600° to 800° F. This indirect heat exchange cooling of the effluent gases to that extent saves the addition of considerable amounts of water in subsequent quenching operations when carbon black recovery requires lower temperatures than the 600° to 800° F. This reduction in the quench water required reduces the volume of the overall effluent issuing through conduit 10 and passing to carbon black recovery. Thus, a smaller and less expensive carbon black recovery system can be used. Carbon black recovery systems involve use of cyclone separators, electrostatic separators, or bag filter systems. Thus, by using this invention, smaller capital investments are required for the carbon black recovery system.

Another variable which causes variations in the temperature of the oil issuing from heat exchanger 16 is the deposition of carbon black on the exterior surface of the coils 9 and 3. As will be understood, the thicker the deposit of carbon black on these coils, the lower will be the temperature of the oil issuing from the coils. When the thickness of deposited carbon black increases and the oil temperature is reduced, the thermocouple 28 senses this reduced temperature and actuates the temperature controller 21 to throttle motor valve 22 thereby reducing the rate of flow of oil through coils 9 with the final result that temperature of the oil passing through conduits 17 and 1 as sensed by thermocouple 28 is returned to its normal predetermined value. However, upon regulating the water spray by actuating valve 32 so that the furnace effluents have a temperature between about 1100° and about 1300° F. this deposition of carbon black on coils 9 is a minimum.

The oil and air preheating and flow control method and arrangement of apparatus is also applicable to other types of carbon black furnaces than the type of furnace illustrated in the drawing.

If desired, a valved pipe can be installed connecting pipe 27 with pipe 4 for by-passing a portion of the air used for combustion of the fuel gas from conduit 6. A temperature sensing means is installed in pipe 4 downstream from the connection with the by-pass pipe for indication or for recording temperature. Thus, by regulating the rate of flow of the by-pass air, the temperature of the air downstream of the by-pass can be regulated to a desired, uniform temperature. The rate of flow of the by-passed air can be regulated manually or automatically, as desired. In the latter case a temperature controller, responsive to temperature, actuates a motor valve in the by-pass line. Such an arrangement compensates for irregularities in the heat exchange of the furnace effluent with the heat exchange coil 3.

While certain embodiments of the invention have been described for illustrative purposes, the invention obviously is not limited thereto.

I claim:

1. A method for preheating to a predetermined temperature a liquid feed at a predetermined flow rate for a process comprising heating a stream of said liquid at a flow rate greater than the flow rate of liquid required by said process by indirect heat exchange with a heating agent, dividing the heated stream of liquid into two portions, regulating the rate of flow of one portion at a rate required by said process, passing said one portion to said process at said rate, sensing the temperature of said one portion and controlling the temperature of said one portion by regulating the rate of flow of the other portion whereby the total rate of flow of said stream of liquid in said heat exchange is varied thereby controlling the temperature of said one portion of heat exchanged liquid.

2. A method for feeding a feed liquid to a process at a predetermined flow rate and at a predetermined superatmospheric temperature comprising heating a stream of said liquid at a flow rate greater than said predetermined flow rate by indirect heat exchange with a heating agent, dividing the heated feed liquid into two portions, regulating the rate of flow of one portion at a rate required by said process, feeding this one portion into the process at said rate, sensing the temperature of said one portion and regulating the temperature of said one portion by controlling the rate of flow of the other portion in response to the sensed temperature whereby said feed liquid is heated to said predetermined temperature.

3. A method for feeding a feed liquid to a process at a predetermined flow rate and at a predetermined superatmospheric temperature comprising passing a stream of said liquid from a run storage source to an indirect heat exchange step and therein heat exchanging said liquid to a superatmospheric temperature and at a flow rate greater than required by said process, dividing the heated stream into two portions, one portion being at a flow rate required by said process, feeding this one portion to the process, returning the other portion to said run storage source, sensing the temperature of said one portion and regulating the temperature of said one portion to said predetermined superatmospheric temperature by regulating the rate of flow of said other portion in response to the sensed temperature thereby maintaining the temperature of said one portion at said predetermined superatmospheric temperature.

4. A method for feeding a feed liquid to a process at a predetermined flow rate and at a predetermined superatmospheric temperature comprising passing a stream of said liquid from a run storage source to an indirect heat exchange step at a flow rate greater than required by said process and therein heat exchanging said liquid to a superatmospheric temperature with an effluent of said process, dividing the heated stream into two portions, one portion being at the flow rate required by said process and feeding this one portion to the process, returning the other portion to said run storage source, sensing the temperature of said one portion and regulating the temperature of said one portion to said predetermined superatmospheric temperature by regulating the rate of flow of said other portion in response to the sensed temperature thereby maintaining the temperature of said one portion at said predetermined superatmospheric temperature.

5. A method for feeding a feed liquid to a process at a predetermined flow rate and at a predetermined superatmospheric temperature comprising passing a stream of said liquid from a source of said liquid to an indirect heat exchange step at a flow rate greater than required by said process and therein heat exchanging said liquid with a heat exchange medium to a superatmospheric temperature, said heat exchange medium being an effluent of the process at a temperature higher than required in the heat exchange step for heating the liquid required by the process, dividing the heated stream into two portions, one portion being at the flow rate required by said process and feeding this one portion to the process, sensing the temperature of said one portion and regulating the temperature of said one portion to said predetermined superatmospheric temperature by regulating the rate of flow of the other portion thereby altering the rate of flow of feed liquid through said indirect heat exchange in response to the sensed temperature thereby maintaining the temperature of said one portion at said predetermined superatmospheric temperature and returning said other portion to said source.

6. A method for producing carbon black comprising passing a stream of feed liquid for a furnace carbon black process from a source to an indirect heat exchange step at a flow rate greater than required by said process and therein heat exchanging said liquid with a heat exchange medium as subsequently produced to a superatmospheric temperature, said heat exchange medium being an effluent of said process and produced at a temperature and flow rate greater than required to heat exchange the feed liquid required by the process, dividing the heat exchanged feed liquid into two portions, one portion being at the flow rate required by said process and partially burning this one portion and at least sufficient free oxygen containing gas for partial combustion of said one portion whereby carbon black in suspension in gases is obtained, said carbon black in suspension in gases being the heat exchange medium as subsequently produced, sensing the temperature of said one portion of the divided heat exchanged feed liquid and regulating the temperature of said one portion to said superatmospheric temperature by regulating the rate of flow of the other portion thereby altering the rate of flow of feed liquid through said indirect heat exchange in response to the sensed temperature thereby maintaining the temperature of said one portion at said superatmospheric temperature and returning the other portion to said source.

7. An apparatus comprising, in combination, a carbon black production reactor having a feed inlet and a product outlet, said inlet and outlet being positioned along the axis of the reactor, a side inlet for inlet of a free oxygen containing gas, an indirect heat exchange means having a pair of inlets and a pair of outlets, one inlet being in operative communication with said product outlet, a feed oil storage means, a first conduit communicating said storage means with the other inlet of said heat exchange means, a second conduit communicating the outlet of said heat exchange means corresponding to said other inlet with said feed inlet, a rate of flow control means in said second conduit, a third conduit communicating said second conduit intermediate said flow control means and said heat exchange means with said storage means, a temperature sensing means in said second conduit, a flow control means in said third conduit and communicating operatively with said temperature sensing means, the latter flow control means being adapted to regulate the rate of flow of liquid in said third conduit and thus in said first conduit in response to temperature sensed by said temperature sensing means.

8. A method for producing carbon black comprising passing a stream of liquid feed for a furnace carbon black process from a source to an indirect heat exchange step at a flow rate greater than required by said process and therein heat exchanging said liquid with a heat exchange medium as subsequently produced, said heat exchange medium being available at a temperature and flow rate greater than required to heat exchange the feed liquid required by the process, dividing the heat exchanged feed liquid into two portions, one portion being at the flow rate required by said process and partially burning this one portion with sufficient free oxygen containing gas for partial combustion of said one portion whereby carbon black in suspension in gases is obtained as said heat exchange medium, sensing the temperature of said one portion of the divided heat exchanged feed liquid and regulating the temperature of said one portion to a temperature required by the process by regulating the rate of flow of the other portion thereby altering the rate of flow of feed liquid through said indirect heat exchange in response to the sensed temperature thereby maintaining the temperature of said one portion at the required temperature and returning the other portion to said source.

9. A heat exchange system comprising, in combination, an indirect heat exchanger having a first inlet and outlet for flow of a heating medium and a second inlet and outlet for flow of liquid to be heated, a carbon black production means having a hot product outlet communicating with said first inlet, a pump in communication with said second inlet for passage of liquid to be heated to said second inlet, a first conduit leading from said second outlet to said carbon black production means, a second conduit communicating said first conduit with a point of disposal, a temperature sensing means and a flow rate controller assembly in said first conduit intermediate the point of communication of said second conduit with said first conduit and said carbon black production means, a flow control means in said second conduit, said flow control means communicating with said temperature sensing means in such a manner as to regulate the rate of flow in said second conduit in response to temperature sensed by said temperature sensing means.

References Cited in the file of this patent

UNITED STATES PATENTS

| | | |
|---|---|---|
| 516,210 | Leach | Mar. 13, 1894 |
| 2,844,443 | King | July 22, 1958 |
| 2,883,271 | Pennington et al. | Apr. 21, 1959 |
| 2,895,805 | Wood et al. | July 21, 1959 |